United States Patent

Anderson

[11] Patent Number: 5,353,614
[45] Date of Patent: Oct. 11, 1994

[54] VEHICLE STEERING-WHEEL LOCK

[75] Inventor: Alexander B. Anderson, Lane Cove NSW, Australia

[73] Assignee: A.B.A. Marketing PTY Limited, Edgecliff New South Wales, Australia

[21] Appl. No.: 984,582
[22] PCT Filed: Sep. 6, 1991
[86] PCT No.: PCT/AU91/00415
  § 371 Date: Mar. 8, 1993
  § 102(e) Date: Mar. 8, 1993
[87] PCT Pub. No.: WO92/04211
  PCT Pub. Date: Mar. 19, 1992

[30] Foreign Application Priority Data

Sep. 6, 1990 [AU] Australia ............... PK2173

[51] Int. Cl.⁵ ............................. B60R 25/02
[52] U.S. Cl. ........................ 70/209; 70/211; 70/226; 70/167
[58] Field of Search .......... 70/209, 211, 212, 225, 70/226, 237, 238, 158, 163, 164, 167, 227, 166, 260

[56] References Cited

U.S. PATENT DOCUMENTS

| | | | |
|---|---|---|---|
| 1,154,389 | 9/1915 | Fogalsang | 70/209 |
| 1,329,913 | 2/1920 | McGuire | 70/209 |
| 1,368,054 | 2/1921 | Recher | 70/212 |
| 1,395,532 | 11/1921 | Tilden | 70/209 |
| 3,982,602 | 9/1976 | Gorman | 70/226 |
| 5,007,259 | 4/1991 | Mellard | 70/226 |
| 5,031,429 | 7/1991 | Wang | 70/209 |
| 5,199,284 | 4/1993 | Lin | 70/207 |
| 5,275,030 | 1/1994 | Cole | 70/209 |

FOREIGN PATENT DOCUMENTS

| | | |
|---|---|---|
| 562201 | 1/1983 | Australia . |
| 389215 | 1/1924 | Fed. Rep. of Germany ........ 70/164 |
| 684481 | 11/1939 | Fed. Rep. of Germany . |
| 919367 | 3/1947 | France . |
| 2487275 | 7/1980 | France . |
| 2501134 | 3/1981 | France . |
| 361686 | 11/1931 | United Kingdom . |
| 2110175 | 4/1982 | United Kingdom ........... 70/260 |

Primary Examiner—Peter M. Cuomo
Assistant Examiner—Darnell M. Boucher
Attorney, Agent, or Firm—Anderson Kill Olick & Oshinsky

[57] ABSTRACT

A steering wheel lock having a generally flat circular cover (1) which substantially totally covers the steering wheel (12) to prevent an authorised access to the wheel or turning of the wheel. The cover (1) includes a perimeter lip (2) to prevent side access to the wheel and to maintain the cover (1) overlapping about the wheel (12). One side of the open diametric face of the device includes a plate section (3), and the opposite side includes a removable diametrically reciprocable pin (7). The pin (7) is attached to a long rigid arm (4) which is lockable in a diametric position by lock (5) which is rigid with the cover (1). The bar (4) prevents substantial turning of the device by contacting surrounding vehicle structure and a spigot (13) prevents substantial turning of the wheel (12) relative to the device.

6 Claims, 1 Drawing Sheet

VEHICLE STEERING-WHEEL LOCK

BACKGROUND ART

This invention relates to a security device to deter the theft of motor vehicles. The device is of the general type which is secured to the vehicle steering wheel by way of a long rigid arm.

There are many devices used in order to prevent, or at least deter, the theft of motor vehicles. It is probably fair to say that all such devices have some drawback or weakness, however, any device which makes the theft of the vehicle more difficult does service a useful purpose and provides vehicle owners with a choice as to theft deterrents.

DISCLOSURE OF INVENTION

The present invention includes, as a basic feature, a steering wheel cover made of tough material to extend wholly over the wheel and being lockable to the wheel to prevent removal or cutting of the wheel and to prevent effective steering control of the vehicle. One particular embodiment of the invention can be described as a steering wheel lock comprising:

a generally flat circular wheel cover means including a lip means about the perimeter extending out of the general plane of the cover means so that it fits over and about a conventional steering wheel, a first securing means rigid of the lip and extending parallel to the general plane of the cover means from one portion of the lip means to another portion so that a corresponding section of the steering wheel fits between the securing means and the cover means, and a second securing means fixed to the cover means approximately diametrically opposition entrapping a corresponding second section of the steering wheel and openable, when unlocked, into a second position to release the steering wheel, So that the wheel cover is able to be locked to a vehicle steering wheel in a manner preventing effective steering control of the vehicle.

In one preferred embodiment of the invention the second securing means comprises a lockable reciprocating rigid arm forming a diametrically extending obstruction means, and an intermediate portion of the arm including a pin which extends radially inwardly of the lip means when in the locked position and is retractable to an unlocked position, the obstruction means extending sufficiently beyond the cover perimeter so as to collide with surrounding vehicle structure when the cover is turned.

BRIEF DESCRIPTION OF DRAWINGS

The following example is a preferred embodiment of the invention explaining its construction and method of use and refers to the drawings in which.

BEST MODE OF CARRYING OUT INVENTION

Figure 1:
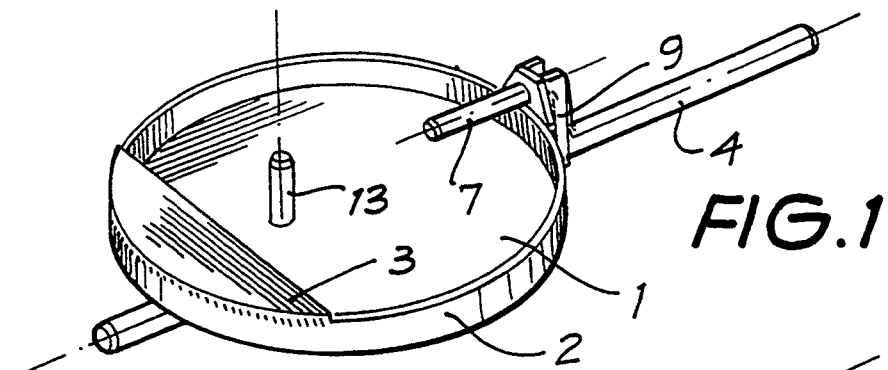
FIG. 1 is an underside perspective view of the device.
Figure 2:
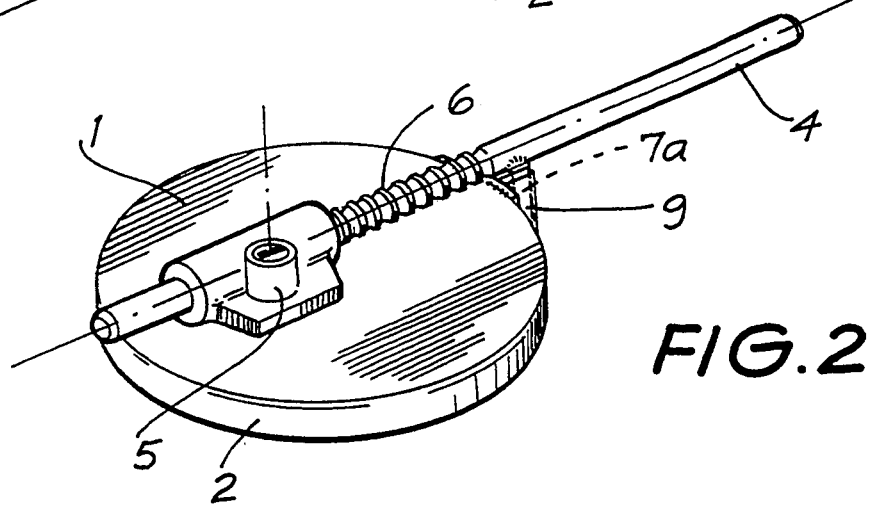
FIG. 2 is a top perspective view of the device.

As seen in FIG. 1, the device includes a generally flat circular cover 1 with a lip 2 about its perimeter. A section of the generally open bottom side defined by the cover 1 and lip 2 is covered by a rigid plate 3. The cover 1, lip 2 and plate 3 are conveniently produced in a single integral component.

Opposite plate 3, in the side of lip 2, is an entrant hole 8 (FIG. 3) which is large enough to accept the passage of the locking pin 7. The pin 7 is rigid of the arm extension 4 which itself includes a knuckled section 6. The knuckled section 6 can travel telescopically through the lock body 5 while unlocked, and fixed in place when locked. The lock body 5 is rigidly attached across the top side of cover 1 in a generally diametric orientation.

Figure 4:
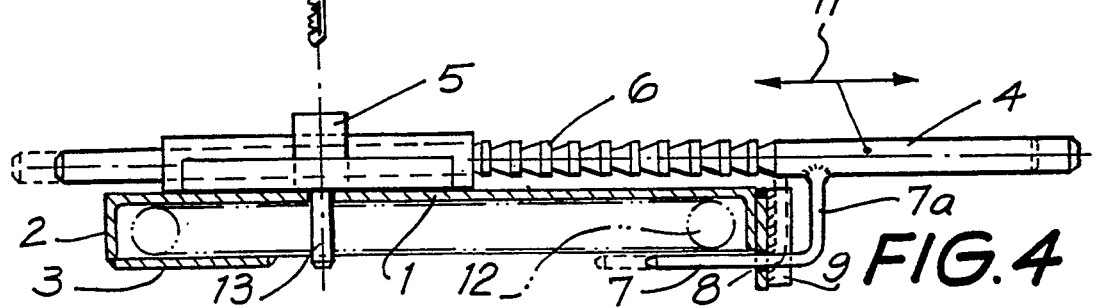
FIG. 4 is a side sectional view of the device.

When the lock 5 is unlocked, the arm extension 4, and thus the pin 7, can be freely reciprocated in the direction of arrows 11, FIG. 4, into the locking position to the left or the unlocked position to the right. A pair of shrouds 9 extend down either side of the entrant hole 8 so that when the pin 7 is in the locked position the connecting section 7a cannot be levered out from the adjacent portion of the lip 2.

In use the lock the arm extension 4 is withdrawn from the lock body 5 sufficiently to substantially fully retract pin 7 from the inside region defined within lip 2. The plate 3 is then slipped under a circumferential section of a wheel 12 (FIG. 4) and once the cover 1 is substantially flush against the wheel 12, the arm extension 4 is fully inserted into the lock body 5 and pin 7 travels fully to the left of the drawing with pin section 7a housed between the shrouds 9. In this position the wheel 12 is fully covered by the cover 1 and the lock device cannot be removed. Spigot 13, rigidly extending from the inside of cover 1, protrudes through a central area of wheel 12 and interacts with any radial arm of the wheel 12 so as to prevent relative rotation between the lock and the wheel.

Once locked in position about the wheel 12, any rotation of the wheel can only occur between points at which the extension arm 4 collides with surrounding rigid structure of the car, such as the car windscreen or adjacent door.

While this arrangement prevents substantial turning of the cover, effective steering control of the vehicle cannot be obtained even if the arm extension 4 is cut off as the steering wheel 12 is fully covered and cannot be gripped.

The lip 2 can comprise, at least as an internal part, a high tensile steel band so that standard cutting or sawing devices cannot be used to gain effective access to the steering wheel. In the case where the device is produced from a plastics material, it is most desirable that the high tensile steel band be completely encased within the plastics material.

Figure 3:
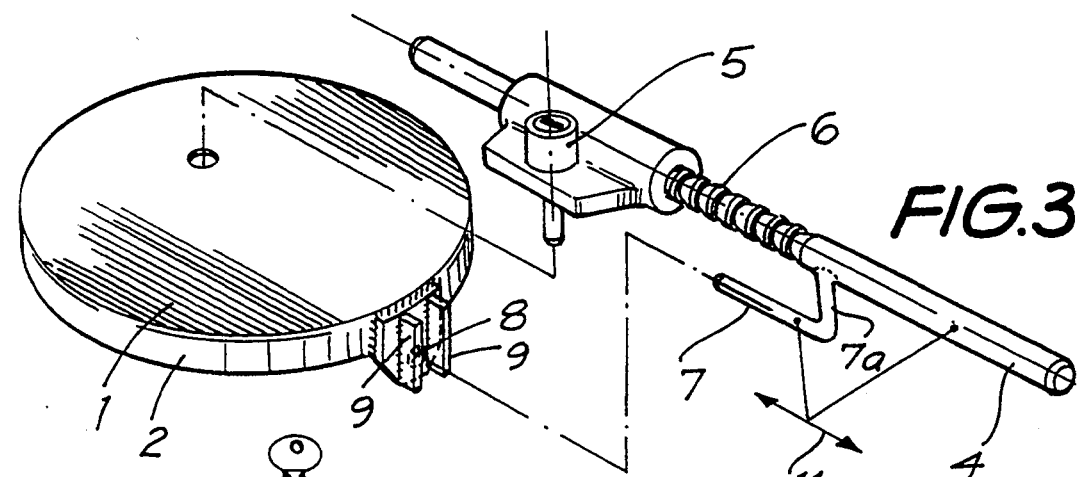
FIG. 3 is an exploded perspective view demonstrating the construction of the device.

As is particularly clear from FIG. 3 of the drawings, the cover 1 extends wholly across one diametric face of the cover device, so as to have no effective discontinuity. The illustrated example of the device does include a hole within cover 1 in order to allow penetration of the spigot 13. Furthermore, although not illustrated in the described example, the cover 1 may include an approximately diametrically running hinge device to allow the cover device as a whole to be folded in half for compact storage, however such hinge should not introduce any substantial effective discontinuity in the cover 1 as such would reduce the strength and effectiveness of the device.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A cover device for locking a steering wheel of a vehicle, said cover device comprising:

a cover means for positioning over the steering wheel and having a size and a shape such that the cover means extends substantially completely across a face of the steering wheel when the cover means is positioned over the steering wheel;

a lip connected with the cover means substantially continuously about a perimeter of the cover means, said lip extending out of a general plane of the cover means a distance defining a shallow region for accommodating the steering wheel;

securing means for entrapping the steering wheel between the cover means and the securing means; and a lock means operatively associated with the cover means and having:

an obstruction means for preventing full rotation of the steering wheel by collision with a surrounding vehicle structure, the obstruction means being movable between an extended position, in which the cover means is locked to the steering wheel and prevents steering of the steering wheel while allowing partial rotation of the cover means relative to the steering wheel, and a retracted position, in which the cover means can be mounted on the steering wheel or dismounted therefrom, and a lock part for locking the obstruction means in the extended position thereof.

2. A device according to claim 1, wherein the obstruction means comprises a reciprocating rigid arm having an intermediate portion and a pin attached to the intermediate portion and extending radially inwardly to the lip in the extended position of the obstruction means.

3. A device according to claim 1, wherein the cover means, the lip, and the securing means form an integral structure, and wherein the securing means is a plate connected with the lip at a side of the lip which is opposite to a side of the lip at which the lip is connected with the cover means.

4. A device according to claim 2, wherein the lip has an entrant hole, and the pin passes through the entrant hole of the lip in the extended position of the obstruction means.

5. A device according to claim 4, further comprising a shroud means arranged externally of the lip and substantially surrounding the entrant hole of the lip, the pin having a portion lying within the shroud means in the extended position of the obstruction means.

6. A device according to claim 1, further comprising a spigot means for substantially limiting relative rotation of the device and the steering wheel, the spigot means extending substantially perpendicular from a surface of the cover means and being surrounded by the lip.

* * * * *